Jan. 8, 1929.

H. F. SCHMIDT 1,698,514

RESTRAINING GUARD FOR ROTORS

Filed May 20, 1927

WITNESSES:

E. Lutz

INVENTOR

H.F.Schmidt

BY a.B.Reavis

ATTORNEY

Patented Jan. 8, 1929.

1,698,514

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

RESTRAINING GUARD FOR ROTORS.

Application filed May 20, 1927. Serial No. 192,952.

My invention relates to restraining guards for rotors, and has for an object to provide a guard of simple and rugged construction and which shall be capable of absorbing a relatively large amount of energy without rupture.

A guard of the type described is used for the purpose of restraining the fragments of a rotor upon failure of the latter; and, as these guards have not, heretofore, been adapted to yield to any appreciable extent under impact, they have had to absorb the kinetic energy of the liberated fragment almost instantaneously. Consequently, relatively heavy guards have been required for this purpose.

The inertia of heavy guards tends to make them more easily ruptured. I have found that inertia effects may be greatly reduced, not only without sacrificing strength, but with an actual increase in strength, by making the guard of a relatively light material which is given an irregular shape, by virtue of which the guard is able to undergo considerable distortion, locally, on impact, the arrangement, preferably, being such that distortion of the guard produces friction by the rubbing of its surfaces. In this way, a tremendous amount of energy may be absorbed. Furthermore, by making the guard of a material which is capable of great reduction of area and of high elongation, it is possible to use even lighter material.

More particularly, therefore, an object of my invention is to provide a guard for the purpose described which shall be arranged to receive and to absorb the energy of impact by virtue of its expansibility, whereby it is able to undergo considerable distortion, preferably with the production of friction, and which shall be made of a material which is capable of great reduction of area and of considerable elongation.

Apparatus embodying the features of my invention is shown in the acompanying drawings, in which.

In accordance with my invention, a guard is made expansible in any suitable manner, as by bending a portion of the guard so as to foreshorten it circumferentially, and the circumferentially extending portions of the guard are arranged to lie, one over the other, in rubbing contact. On failure of the rotor, the impact of a liberated fragment tends to expand the guard and, thus, to straighten out the bent portion, and also to produce friction between the contacting surfaces.

Figure 1:
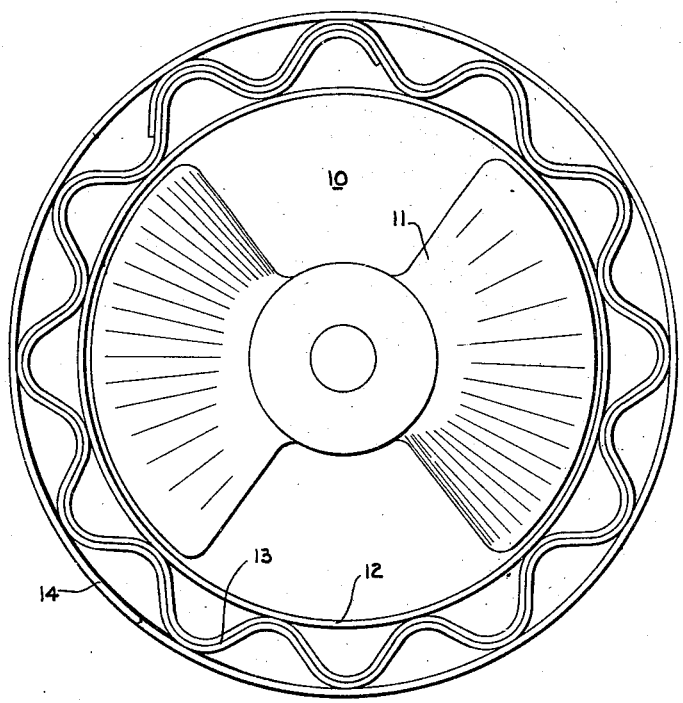
Fig. 1 is an end elevation of a rotor enclosed by a guard.

Referring now to the drawing for a better understanding of my invention, I show, in Fig. 1, a fluid translating device, indicated generally, at 10, and comprising a rotor 11, which is enclosed in a casing 12, the latter being encompassed by a transversely corrugated band 13, which is, preferably, made of steel of high elongation and of relatively great reduction of area. The band 13 is preferably a laminated structure, formed by laying successive convolutions against each other. If desired, the band 13 may be secured to the casing 12 at suitable points, although of course this is not necessary. Likewise, the band 13 may be protected by enclosing it within a cylinder 14.

By providing the expansible guard 13 with substantially uniformly spaced corrugations, it is assured that this guard will be equally capable of expanding in all directions. Also, should the impact be sufficient, all of the corrugations may be straightened with a corresponding absorption of energy to permit expansion in any one direction.

Further, the straightening of the corrugations causes the laminæ to rub against each other, and this together with the tendency of the guard to expand linearly by sliding its laminæ across each other, produces an enormous amount of friction. It will readily be seen, therefore, that, though of relatively light material, a guard of this type, made of steel of high elongation and of great reduction of area, will be capable of withstanding terrific impacts without rupture.

Figure 2:
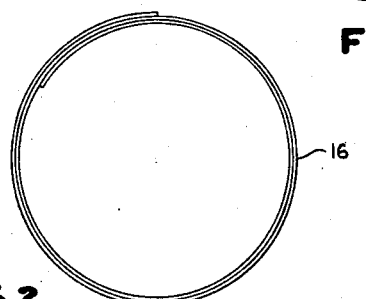
Figs. 2 and 3 are views of modified forms of guards.
Figure 3:
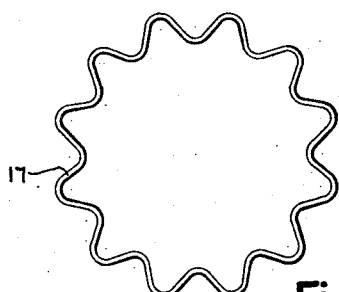

It will also be obvious, that the corrugations may be omitted and that I may use only the laminated structure 16, as shown in Fig. 2; or that the guard may be made of a corrugated band 17, in which the laminations are not present, as shown in Fig. 3.

While I have shown my invention in several forms, it will be obvious to those skilled in the art, that it is not so limited, but is susceptible to various other changes and modifications without departing from the spirit thereof, and I desire, therefore, that only such limitations shall be placed thereupon as are imposed by the prior art or as are specifically set forth in the appended claims.

I claim—

1. A restraining guard for rotors comprising a resilient band extending circumferentially about the rotor and having its body portion bent alternately inwardly and outwardly towards and away from the rotor center to form a series of undulating curves.

2. A restraining guard for rotors comprising a laminated resilient band extending circumferentially about the rotor and having its body portion bent alternately inwardly and outwardly towards and away from the rotor center to form a series of undulating curves.

3. A restraining guard for rotors comprising an elongate metallic band wound upon itself to form a laminated structure enclosing the rotor.

4. A restraining guard for rotors comprising an elongate metallic band wound upon itself to form a laminated structure extending circumferentially about the rotor and having its body portion bent alternately inwardly and outwardly towards and away from the rotor center so as to form a series of undulating curves.

5. The combination with a rotor and a casing surrounding said rotor, of a restraining guard surrounding said casing and comprising an expansible band.

6. The combination with a rotor and a casing surrounding said rotor, of a restraining guard surrounding said casing and comprising an expansible band in the form of a transversely corrugated strip of resilient material.

7. The combination with a rotor and a casing surrounding said rotor, of a restraining guard surrounding said casing and comprising a band having portions capable of being expanded locally.

8. The combination with a rotor and a casing surrounding said rotor, of a restraining guard surrounding said casing and comprising a laminated resilient band.

9. The combination with a rotor and a casing surrounding said rotor, of a restraining guard surrounding said casing and comprising a circularly extending resilient band having its end portions overlapping and in rubbing contact.

In testimony whereof, I have hereunto subscribed my name this 6th day of May, 1927.

HENRY F. SCHMIDT.